United States Patent [19]

Kincheloe et al.

[11] 4,328,065
[45] May 4, 1982

[54] EXTRACTOR PIN

[75] Inventors: David W. Kincheloe, West Chicago; David O. Neathery, Wheaton, both of Ill.

[73] Assignee: King Instrument Corporation, Westboro, Mass.

[21] Appl. No.: 150,595

[22] Filed: May 16, 1980

[51] Int. Cl.³ .............................................. B65H 21/00
[52] U.S. Cl. ................................... 156/502; 156/505; 242/56 R; 242/58.4
[58] Field of Search .................... 156/157, 159, 304.3, 156/502, 505, 506; 242/58.4, 56 R, 58.1, 199

[56] References Cited

U.S. PATENT DOCUMENTS

| | | | |
|---|---|---|---|
| 3,997,123 | 12/1976 | King | 242/58.4 |
| 4,061,286 | 12/1977 | King, Sr. et al. | 156/502 |
| 4,136,838 | 1/1979 | Bosco | 242/58.4 |
| 4,216,052 | 8/1980 | Zielke | 156/506 |
| 4,230,520 | 10/1980 | Morgan | 156/506 |

*Primary Examiner*—Michael G. Wityshyn
*Attorney, Agent, or Firm*—Schiller & Pandiscio

[57] ABSTRACT

A tape extractor for a cassette tape loader being slidably mounted with respect to a tape loading position and a tape splicing position, for extracting a tape leader from a tape cassette positioned in the tape loading position, for carrying the tape leader to the splicing position where the tape leader is automatically cut and spliced to recording tape for winding into the tape cassette. The tape extractor includes a rectangularly shaped hollow finger for vacuum sucking the tape leader from the cassette and forming the leader in the shape of a loop. A pneumatically operated pin is disposed in relation to the hollow for movement into the leader loop for providing a mechanical bearing surface for keeping the tape leader under tension as the tape extractor is moved to the splicing position. At the splicing position a separator arm mechanically separates the two portions of the tape leader forming the sides of the tape loop for permitting unobstructed tape splicing to be performed.

17 Claims, 5 Drawing Figures

EXTRACTOR PIN

BACKGROUND OF THE INVENTION

The present invention relates to a cassette tape loader, and more particularly to apparatus for extracting a tape leader from a tape cassette for presentation of the leader at a splicing location for splicing recording tape to the leader for loading the recording tape into the cassette.

Heretofore, cassette loading machines have included a tape extractor which vacuum sucks a tape leader from the cassette to be loaded and transports the tape leader to a splicing position while the tape leader is held under vacuum pressure during transport. The tape leader is thereafter vacuum sucked onto a pair of splicing blocks in which the tape leader is cut and spliced to recording tape for loading into the tape cassette.

As the tape leader is carried down across the splicing blocks by the extractor, the splicing blocks suck the leader down immediately causing the leader to pull from the vacuum of the extractor holding the leader. Once the leader tape is set to the splicing blocks, a separator arm mechanically separates the upper portion of the tape leader from the lower portion so that the lower portion may be spliced to recording tape.

Because a vacuum source is utilized to hold the tape leader during movement of the leader from the cassette to the splicing position, the rate of movement of the leader from the cassette is limited by the amount of tension placed on the leader, which tension can not overcome the force supplied by the vacuum force holding the leader during transport. Also, the vacuum sucking of leader onto the splicing blocks conjointly with the pulling away of the leader from the extractor often provides misalignment of the tape across the splicing blocks. Also, the two portions of the leader in some cases stick together preventing the separator arm from separating the two portions prior to performing the splicing operation. The separator arm will not uniformly contact the tape leader each time the tape is vacuum sucked onto the splicing blocks where tape misalignment and sticking together of the tape occurs.

It is therefore an object of the present invention to provide an extractor device for extracting a tape leader from a cassette and moving the tape leader to the splicing location in such a fashion as to overcome the above-described problems.

It is yet another object of the present invention to increase the speed with respect to which a tape leader may be withdrawn from a tape cassette and moved to a splicing location.

It is still another object of the present invention to provide an extracting device which more accurately positions the tape leader of a tape cassette into a splicing position.

It is yet another object of the present invention to provide an extractor device for extracting a tape leader from a tape cassette for movement of the tape leader under tension into a particular spatial relationship with the separator arm for permitting separation of the upper and lower portion of the tape leader in a uniform fashion for unobstructed cutting and splicing of the tape leader.

SUMMARY OF THE INVENTION

These and other objects of the invention are achieved by a tape extractor device which extracts a tape leader from a tape cassette at a tape loading position and carries the tape leader to a tape splicing position. The tape extractor retrieves the tape leader from the cassette and mechanically holds the tape during movement of the tape to the splicing position. The tape may be moved under tension and held under tension during cooperative manipulation of the tape by a tape separator at the tape splicing location.

DESCRIPTION OF THE PREFERRED EMBODIMENT

Figure 1:
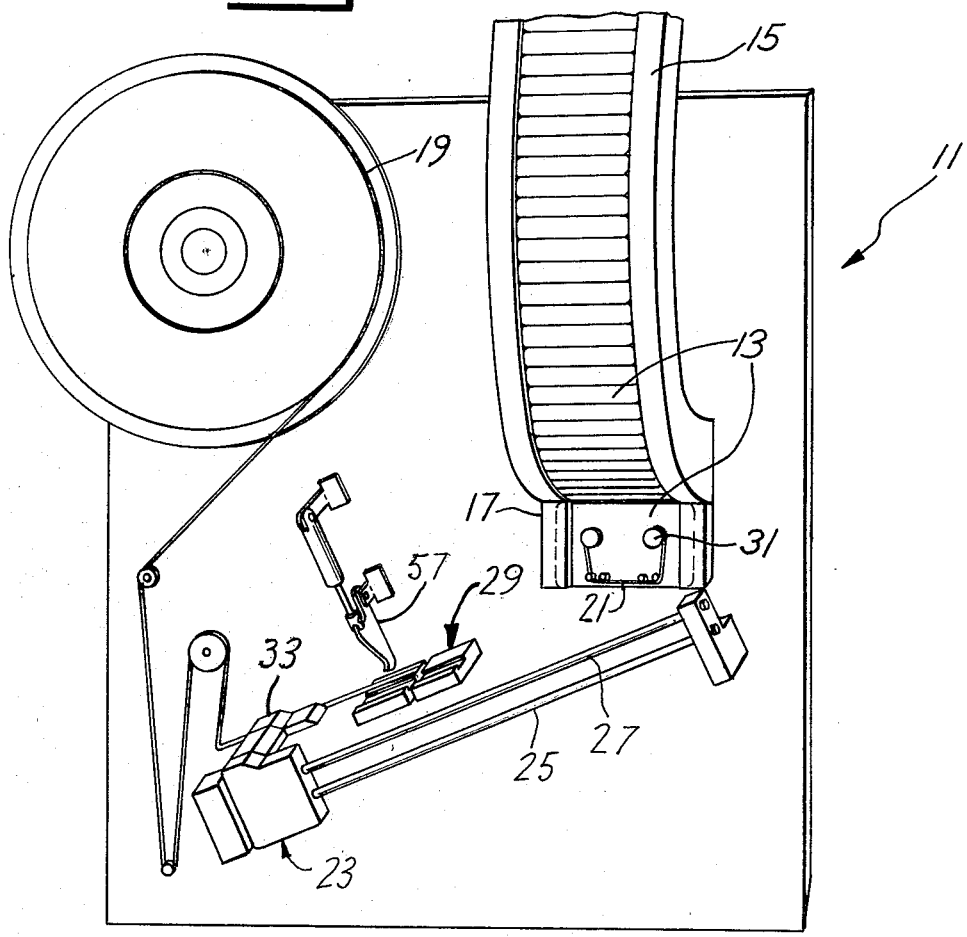
FIG. 1 is a perspective view of a preferred embodiment of a cassette tape loader which may utilize an embodiment of the present invention.

Referring to FIG. 1, a cassette tape loader 11 is illustrated in which a plurality of tape cassette 13 are stacked in an input tray 15 for successive presentation of a single cassette to a tape loading station 17. A recording tape supply reel 19 carries a continuous roll of magnetic cassette tape which is to be cut and loaded into each of the cassettes of tray 15.

Each of the tape cassettes 13 includes a tape leader 21 which is a short length of tape wound on reels within the cassette, which is to be cut and spliced to each end of a length of recording tape to be loaded into the cassette from supply reel 19. More particularly, a tape extractor 23 is slidably mounted on a pair of rods 25, 27 for movement to the tape loading station 17, for retrieving tape leader 21 and pulling the tape leader from the cassette and back to a tape splicing station 29. At splicing station 29, the tape leader is first cut into two portions and one of the portions is spliced to the end of the recording tape of reel 19.

After the tape leader has been spliced to the recording tape, the tape cassette is wound by driving one of its cassette hubs 31 for loading the recording tape into the cassette. After a predetermined length of tape has been wound into the cassette, the recording tape is cut at splicing station 29 and spliced to the tail-end of the cut leader 21. The tail-end of the cut leader 21 is then released from the splicing position and quickly wound into the cassette, whereupon the cassette is ejected and a new cassette 13 is moved to tape loading station 17 for repeating the above steps.

An example of such a cassette loader is a Model 750, 760 or 770 Automatic Cassette Tape Loader manufactured by King Instrument Corporation of Westboro, Mass. Such cassette tape loaders are well known in the art, and the present invention provides an improvement to the basic King Models 750, 760 and 770. Reference is made to many of King's patents, U.S. Pat. Nos. 3,637,153; 3,753,834; 3,787,270; 3,737,358; 3,717,314; 3,753,835; 3,825,461; reference is also made to King's Instruction Manual, "Automatic Cassette Tape Loader, Model 750", © King Instruments Corporation 1971, 1975. Since the King machines are well known in the art, a detailed description thereof will be made only where necessary to facilitate a clear understanding of the present invention.

Figure 2:
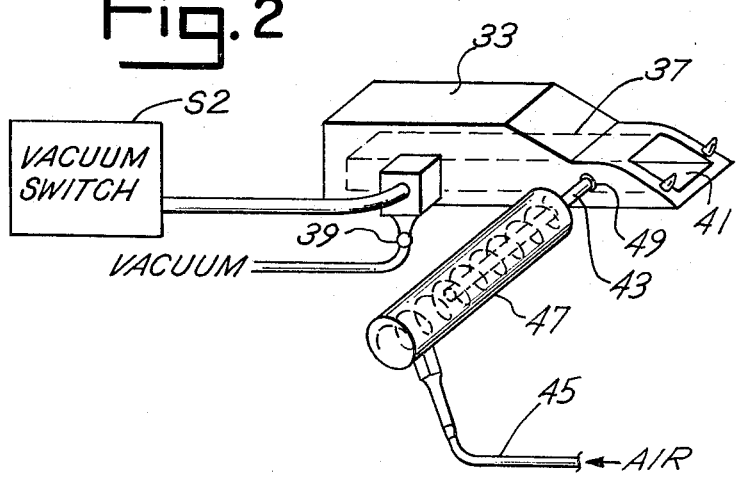
FIG. 2 is a perspective view of an embodiment of a tape extractor for use in the cassette tape loader of FIG. 1.

Referring to FIG. 2, a finger or vacuum probe 33 is illustrated in greater detail which is secured to tape extractor 23. Vacuum probe 33 includes a rectangular shape hollow channel 37 as shown in dotted lines. A vacuum input port 39 is connected at the far end of channel 37 for producing a vacuum within the channel providing a suction at the channel's entrance 41.

Extractor device 23 is driven to tape loading station 17 making contact with the tape cassette to be loaded. Entrance 41 is thus positioned in contact or close relation to tape leader 21 for sucking the leader into channel 37 when vacuum is applied to the probe via port 39. As tape leader 21 is sucked into channel 37 the tape is shaped by the channel in the form of a loop as indicated in FIG. 3.

A pneumatically operated pin 43 is positioned in relationship with channel 37 and is selectively actuable in accordance with the delivery of air via a line 45 into an air cylinder 47 for moving pin 43 across channel 37 of the probe. An aperture 49 is provided in one side of probe 33 for permitting passage of the pin through the channel and into contact with the opposite side wall of the probe. Air Cylinder 47 is spring loaded for causing retraction of pin 43 upon discontinuance of air being input along line 45.

Figure 3:
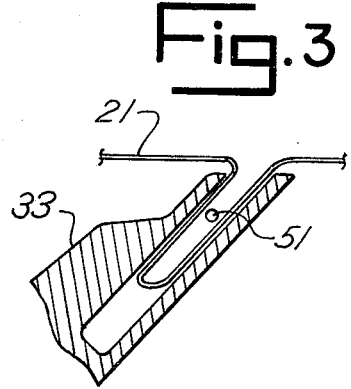
FIG. 3 is a cross-sectional view of the tape extractor of FIG. 2, in which a tape leader is shown within the extractor.

A hole may be drilled in extractor 23 for housing air cylinder 47 into a position with respect to vacuum probe 33 to permit pin 43 to be driven into the loop of the tape at a position 51 as shown in FIG. 3. The pin cylinder 47 remains deactuated until the loop of leader tape 21 is sucked into channel 37, afterwhich the pin cylinder is actuated to drive pin 33 into the tape loop for securely holding the loop within the channel. The vacuum through port 39 may be discontinued once pin 43 is moved into position.

Pin 43 is cylindrical in shape providing a sliding bearing surface for the tape leader as tape extractor 23 pulls the tape from the cassette and into the splicing station 29. Preferably, aperture 49 is located as far back into channel 37 as possible, where the tape's sure to be looped. The spring loaded air cylinder 47 and pin 43 may be a conventional component, as for example, a Model SM6 pnuematic operated pin manufactured by Clippard Company, Cincinnati, Ohio.

Figure 4:
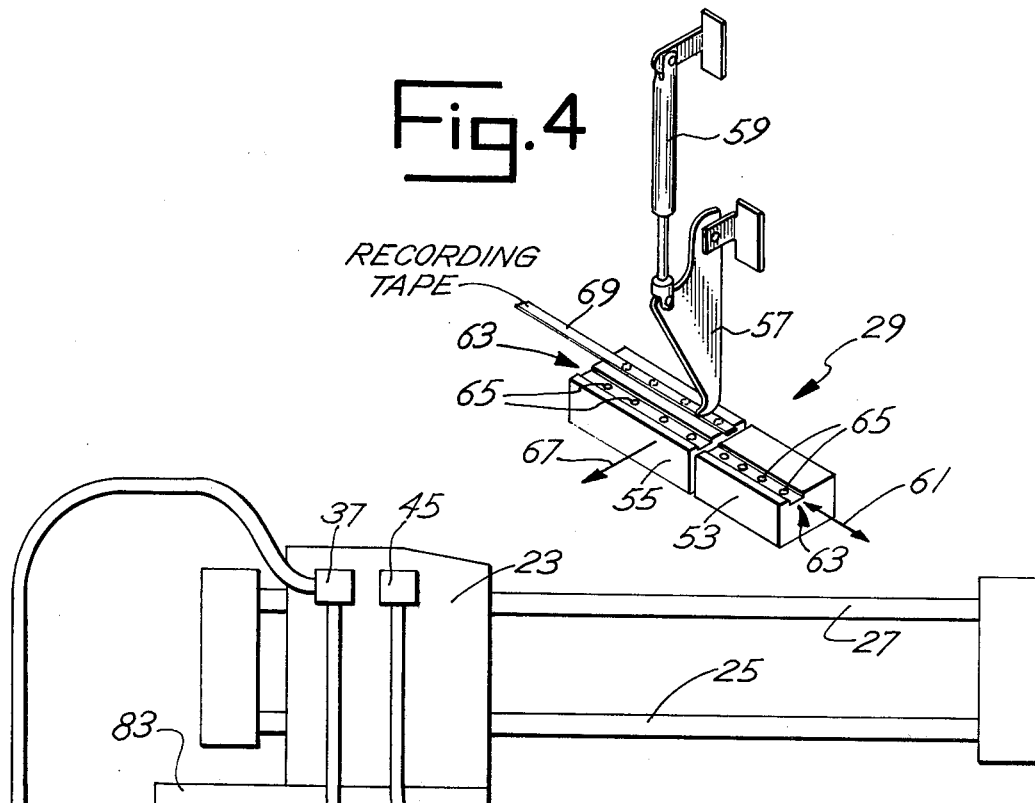
FIG. 4 is a perspective view of a tape separator arm and a pair of splicing blocks of the tape loader of FIG. 1.

Extractor 23 carries the tape across a stationary splicing block 53 and a movable splicing block 55, which form part of splicing station 29 and are shown in FIG. 4. A separator arm 57 is pivotally mounted for movement above splicing block 55 via operation of an air cylinder 59. Leader tape 21 is moved along a path 61 guided within a groove 63 formed in the top of splicing blocks 53, 55. A plurality of vacuum openings 65 are provided in the top of the groove 63 for sucking the tape leader down onto the blocks. Since the tape leader is mechanically held by the extractor during movement of the tape across the blocks, the vacuum from openings 65 does not act to pull the tape away from the extractor but does keep the lower portion of the tape loop down onto the blocks preventing the tape from sticking to the upper portion of the tape loop.

After the extractor has moved the leader across blocks 53, 55 and while the tape is still held under tension by pin 43, separator arm 57 is activated separating the upper and lower portions of the loop of the leader tape. The upper portion is deflected away from splicing blocks 53, 55 as arm 57 is pivoted outward from the machine face. Once deflected, the leader tape is released from extractor 23 letting the upper portion of the leader catch the separator arm which is held in its deflected position, while the lower portion of the leader is vacuum retained to both splicing blocks 53, 55. The lower portion of the leader is then cut by a cutting and splicing mechanism (not shown) which is located in and forms part of splicing station 29. One end of the cut leader is held to splicing block 53 while the other end of the cut leader is held to splicing block 55. Block 55 is then moved laterally outward from the machine face in the direction indicated by arrow 67 for aligning the end of recording tape 69 (from reel 19) to the front end portion of the leader tape held on block 53. The leader tape is then spliced to the recording tape.

The cassette is then wound taking the recording tape into the cassette until a predetermined amount of tape has been loaded. The recording tape is then cut; block 55 is moved back into position; the tail end portion of the leader held to block 55 is then spliced to the end of the recording tape held to block 53; separator arm 57 and vacuum blocks 53, 55 release the tape for permitting the final portion of the tape to be wound into the cassette. The above referenced U.S. Pat. No. 3,737,358 describes this splicing operation in greater detail.

Figure 5:
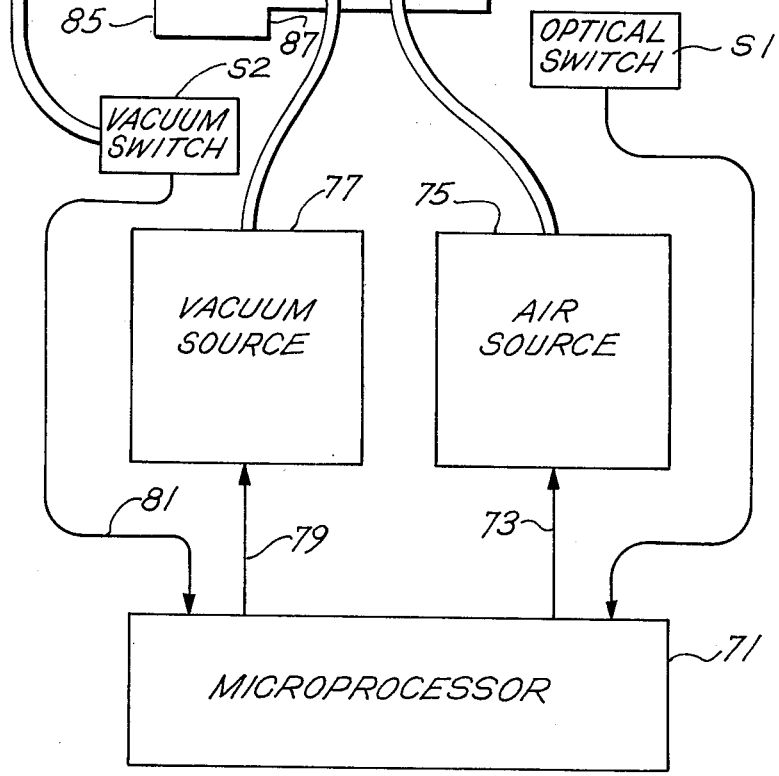
FIG. 5 is a partial block diagram representation of the control components for the tape extractor of FIG. 2.

FIG. 5 illustrates a microprocessor 71 which controls the operations of extracting the tape leader and splicing the leader to the recording tape. Microprocessor 71 controls the movement of extractor 23 along rods 25, 27 by the use of air pressure via a control conductor represented by a line 73 connecting the microprocessor to source of pressurized air 75. Microprocessor 71 also controls operation of a vacuum source 77 and the air source 75 so as to respectively control the vacuum within probe channel 37 and the actuation of pin 43. A line 79 represents the control of vacuum source 77 by microprocessor 71.

A switch S1 is disposed along the path of movement of extractor 23 for signaling microprocessor 71 as to when extractor 23 reaches two positions with respect to the tape splicing position. A second vacuum switch S2 is utilized to monitor the acquisition of the tape leader within channel 37. When extractor 23 reaches the tape loading station, the microprocessor responsively actuates vacuum source 77 for sucking the leader tape within the probe channel. Switch S2 senses the leader tape moving to the back of the channel and relays such information to microprocessor 71 along a conductor 81. The microprocessor responsively actuates air source 75 for moving pin 43 within the loop of the leader. Thereafter, the microprocessor discontinues operation of vacuum source 77, terminating the suction within probe 33. The extractor 23 is then moved to the splicing position.

A switching member 83 is carried by extractor 23 for moving in cooperative relationship with switch S1 for signalling microprocessor 71 as the extractor reaches two discrete positions in its path of movement past the splicing position. Two edges 85, 87 of member 83 are sensed by switch S1 which may comprise an optical switch.

Upon sensing leading edge 85, the microprocessor actuates separator arm 57 for separating the upper and lower loop portions of the leader tape. Upon sensing the trailing edge 87, the microprocessor controls the retraction of pin 43 for releasing the tape from probe 33. In order to ensure that pin 43 does not nick or mar the tape as the pin is retracted, the microprocessor upon sensing edge 87 changes the direction of movement of extractor 23 and moves extractor 23 for a very short distance back toward the splicing station. This very short movement releases the tension on the leader permitting the pin to be retracted without nicking the leader tape. Also, since tension on the leader has been removed, the use of a mechanical spring in the pin cylinder 47 provides sufficient force (upon the removal of driving air) to retract the pin.

It should be understood, of course, that the foregoing description relates to a preferred embodiment of the present invention and that other modifications or alterations may be made to the preferred embodiment without departing from the spirit or scope of the invention as defined by the appended claims.

What is claimed is:

1. In a cassette tape loader for loading tape into a cassette having a tape leader, said loader having a tape loading station and a tape splicing station, the improvement comprising tape extractor means movably mounted for movement into relationship with said tape loading station and said tape splicing station for extracting a tape leader from a cassette at the tape loading station and carrying the tape leader to the tape splicing station, said tape extractor means comprising means for vacuum sucking the tape leader from the cassette and means for thereafter mechanically holding the sucked tape leader during movement of the tape extractor means to the splicing station.

2. A cassette tape loader according to claim 1 wherein said tape extractor means includes means for causing the sucked tape leader to form a loop and a pin for mechanically holding the looped tape leader during movement of the tape extractor means to the splicing station.

3. A cassette tape loader according to claim 2 comprising means for pneumatically actuating said pin.

4. A tape cassette tape loader according to claim 1 and further including splicing means at said tape splicing station for receiving the tape leader under tension caused by said means for mechanically holding the sucked tape leader as the tape leader is moved into relationship with the tape splicing station, whereby the tape leader is accurately positioned for splicing.

5. A cassette tape loader according to claim 4 wherein said tape leader is looped so as to form two portions of said tape leader at the splicing station and further wherein said splicing means includes a separator arm for moving one of said two portions to a position adjacent the splicing station, said separator arm contacting said one of said two portions when the tape leader is under tension caused by its being held by said extractor means, whereby the separator arm contacts the tape leader at a uniform position.

6. In a tape cassette tape loader having a tape loading station for placement of a tape cassette for loading, the tape cassette having a tape leader, the improvement comprising tape extractor means mounted for movement into relationship with said tape loading station and a tape splicing station, said tape extractor means including:

means for extracting the tape leader from a cassette at the loading station and forming the tape leader into a loop; and mechanical tape leader holding means for inserting a mechanical member within the loop of said tape leader for contacting the tape during movement of the extractor means to the tape splicing station.

7. A cassette tape loader according to claim 6 wherein said means for extracting the tape leader and forming it into a loop comprises vacuum sucker means for sucking the tape leader from the cassette.

8. A cassette tape loader according to claim 7 wherein said extractor means includes a hollow finger means into which said sucker means sucks the tape leader for forming said loop.

9. A cassette tape loader according to claim 8 wherein said mechanical tape leader holding means includes a pin member slidably actuable for movement into said loop.

10. A cassette tape loader according to claim 9 wherein said pin member is pneumatically actuated.

11. In a tape cassette loader having (a) a tape loading station for placement of a tape cassette for loading, the tape cassette having a tape leader, and (b) a splicing station for splicing tape to a tape leader, the improvement comprising tape extractor means mounted for movement alternately between said tape loading station and said tape splicing station for extracting a tape leader from a tape cassette at the tape loading station and carrying the tape leader to the tape splicing station, said tape extractor means comprising means for extracting the tape leader for movement in the shape of a loop past the splicing station and means movable into the loop having a surface for physically contacting the inside tape portion of the loop and thereby keeping the tape under tension as the loop moves past the splicing station.

12. A cassette tape loader according to claim 11 further including control means for (a) controlling movement of said surface out of said loop and (b) controlling movement of said extractor means, said control means effecting movement of said extractor means for loosening the tension of said loop prior to movement of said surface out of said loop, whereby to facilitate release of the tape leader from said extractor means.

13. In a tape cassette tape loader for loading tape into a tape cassette of the type having a tape leader, the improvement comprising a movable suction-type tape extractor means for extracting a tape leader from a tape cassette at a tape loading position and moving the tape leader in the shape of a loop to a tape splicing position, said tape extractor means including a surface movable into the loop in position to physically contact an inner surface of the loop and thereby keep the tape leader under tension as the loop moves toward the splicing position; and splicing means at the splicing position for receiving the tape leader under tension and accurately positioning the tape leader for splicing.

14. A cassette tape loader according to claim 13 wherein said tape extractor means loops the tape leader so as to form two tape leader portions at the splicing position, and further wherein said splicing means includes a separator arm for actuating and moving one of said two tape leader portions while the leader is under tension.

15. In a tape cassette loader the improvement comprising:

movable tape extractor means for (a) extracting a tape leader from a tape cassette at a tape loading position, (b) forming the tape leader in the shape of a loop having two portions, and (c) moving the leader along a predetermined path of travel to a tape splicing position, said tape extractor means including a surface movable into the loop and adapted for physically contacting a portion of the loop for keeping the tape under tension as the loop moves past the splicing position;

splicing means located in the splicing position for receiving the tape leader as the leader is moved by the tape extractor means;

separator means selectively actuable for moving one of said two portions to a selected position relative to said splicing means; and monitoring means for monitoring the position of said extractor means for actuating said separator means when said extractor means reaches a predetermined position in said path of travel.

16. A cassette tape loader according to claim 15 wherein said monitoring means monitors the position of said extractor means with respect to a second predetermined position in said path of travel and is adapted for causing release of the tape leader from said tape extractor means when said extractor means reaches said second predetermined position.

17. A cassette loader according to claim 16 wherein said monitoring means includes a member carried by said extractor means and a sensor fixed with respect to said path of travel for monitoring said member.

* * * * *